April 2, 1968     J. B. SHEPARD     3,375,724
READ-OUT DEVICE AND DRIVE THEREFOR
Filed Dec. 3, 1965
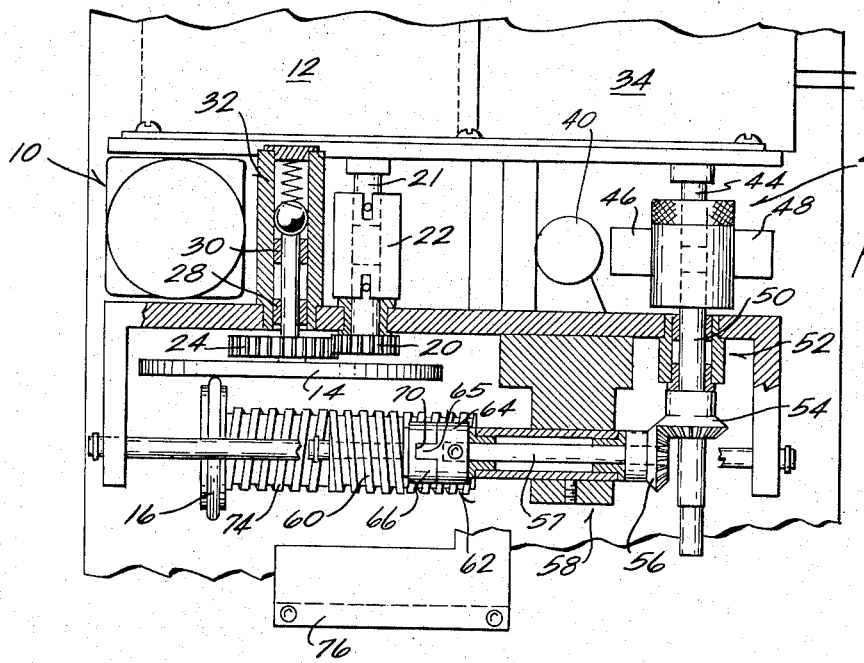
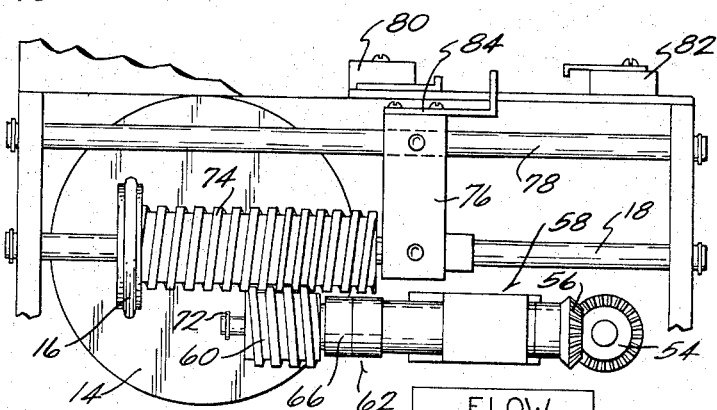
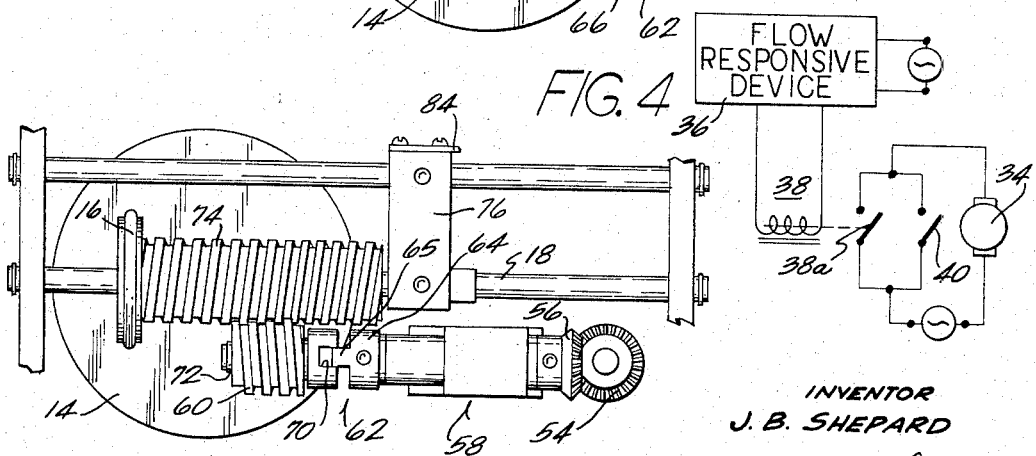
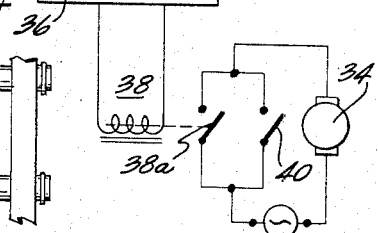
INVENTOR
J. B. SHEPARD
BY Joseph A. Lemignani
ATTORNEY United States Patent Office 3,375,724
Patented Apr. 2, 1968

3,375,724
READ-OUT DEVICE AND DRIVE THEREFOR
J. B. Shepard, Whittier, Calif., assignor to Badger Meter Manufacturing Company, Milwaukee, Wis., a corporation of Wisconsin
Filed Dec. 3, 1965, Ser. No. 511,449
11 Claims. (Cl. 74—194)

ABSTRACT OF THE DISCLOSURE

This disclosure relates to an arrangement wherein an input disc is driven at a constant speed and a wheel which is connected to a variable speed source, engages the disc surface for rotation with the disc to assume a position on the disc surface corresponding to the driven speed of the wheel. The connection between the wheel and the variable speed source is through two interengaging worm gears and a lost motion connection. One worm gear is fixed to and moves with the wheel and the other worm gear is connected to and driven by the variable speed source. The lost motion connection is in the drive connection between the second worm gear and the variable speed source and is effective to permit the second worm gear to move freely in an axial direction with respect to the first worm gear within the prescribed axial limits. At the extremes of the axial limits, the second worm gear is held against further axial movement relative to the first worm gear and transmits driving movement to the first worm from the variable speed source. The amount of relative movement provided by the lost motion connection is sufficient to accommodate fluctuations in the variable speed source within a permissible range without moving the wheel so that a major change in speed is necessary to vary the position of the wheel on the disc surface. In one application, the variable speed source can be controlled by a meter and the interaction of the wheel and disc used to provide a visual read-out corresponding to flow through the meter.

---

This invention relates to indicators or read-out devices and, more particularly, to the drive mechanism for such indicators as are used, for example, in connection with fluid flow measuring devices and the like.

A conventional type of indicator utilizes a "disc and wheel" combination in its drive mechanism to translate a variable condition, such as fluid flow, into a condition capable of affording a direct visual read-out. In one such arrangement, the "disc" is driven at a preselected constant speed and the "wheel" is driven at a speed corresponding to the variable condition to be measured so that the position which the "wheel" assumes with respect to the "disc" corresponds to the variable condition. With a variable input to the "wheel," the "wheel" will tend to "hunt" on the "disc" about the point corresponding to the input condition, this is particularly true where the drive for the "wheel" is a pulsed input. This invention is concerned with this problem of "hunting."

Accordingly, a general object of this invention is to provide a drive of this type which provides an accurate and true read-out of a variable condition.

A further general object of this invention is to prevent "hunting" in indicators using drives of this type and to do so with a relatively simple construction.

A more specific object of this invention is to prevent "hunting" of a "disc and wheel" combination where the variable input thereto is pulsed.

For the achievement of these and other objects, this invention contemplates the inclusion of a lost motion connection in the drive for the "wheel," or the "disc" if that is the element being driven in accordance with the condition being measured, which is sufficient to accommodate fluctuations in the input to the "wheel" within a particular range without producing movement of the "wheel" with respect to the "disc."

Other objects and advantages will be pointed out in, or be apparent from, the specification and claims, as will obvious modifications of the embodiment shown in the drawings, in which:

FIG. 1 is a top plan view of an indicator incorporating this invention;

FIG. 2 is a front elevation of a portion thereof with the worm gears angularly displaced from their position of FIG. 1, and; illustrating the lost motion connection in one position;

FIG. 3 is another front elevation of a portion thereof with the worm gears again angularly displaced from their position of FIG. 1 illustrating the lost motion connection in another position; and FIG. 4 is a schematic view of an energizing circuit for the "wheel" drive motor.

This invention has application to any arrangement wherein it is desired to achieved a relatively steady read-out from a variable input, for example, one which is pulsed or otheriwse intermittent. Apparatus of the type in which this invention is embodied is intended to compare a variable quantity, which varies in accordance with a medium or condition being measured, with a known or preselected quantity and to produce a read-out on the basis of that comparison. For example, this invention could be used in apparatus intended to respond to a pulsed input generated in accordance with fluid flow and provide a visual read-out in accordance with that flow. Although not limited to such an application, this invention will be described as though it were embodied in a fluid flow measuring arrangement.

With reference to the drawing, a conventional "disc and wheel" assembly 10 includes a frame 11, synchronous motor 12, "disc" 14 connected to and driven by the motor, and "wheel" 16 freely supported on shaft 18 for both axial and rotational movement. The actual drive for "disc" 14 is effected by means of gear 20 connected to motor output shaft 21 through coupling 22 and engaging gear 24 connected to the "disc." Gear 24 is supported on shaft 26 journaled in bearings 28 and 30 and engaging thrust bearing assembly 32 so that desired frictional engagement is maintained between the "disc" and "wheel."

The speed of wheel 16 will correspond to the speed of the particular circumferential line with which it is engaged and therefore will vary as it moves radially across the face of disc 14. With no other external forces acting on wheel 16 it would tend to assume a position at the center of disc 14 where it would virtually be at rest. Should wheel 16 be driven from a source other than disc 14 it will seek a position on the disc which corresponds to the driven speed of the wheel and will maintain that position so long as its driven speed remains constant. Thus, wheel 16 can be driven from an unknown source (a condition or quantity to be measured) and the position of the wheel will correspond to that source.

In the illustrated embodiment, the input to wheel 16 includes a second motor 34. The motor is pulsed as for example through a circuit illustrated schematically in FIG. 3. A suitable fluid flow responsive device 36, of any conventional construction, is exposed to the flow to be measured. Each time flow responsive device 36 passes a given amount of flow, e.g. one gallon, it pulses relay 38. This closes relay switch 38a establishing a circuit to motor 34 from source 39. In a manner to be described, rotation of motor 34 controls a second switch 40 in the motor circuit. Switch 40 closes upon initial rotation of the motor and after a desired amount of rotation switch 40 is opened. Relay 38 is self-timed and relay switch 38a opens after switch 40 is closed but before it opens so that initially motor 34 is energized through relay switch 38a but control is subsequently transferred to switch 40 and motor 34 is de-energized when switch 40 opens. Specifically, switch 40 is a normally-closed magnetic reed switch mounted adjacent magnetic assembly 42 which is connected to and rotatable with output shaft 44 of motor 34. Magnetic assembly 42 includes diametrically opposed magnets 46 and 48 and when the motor is at rest one of the magnets is positioned at the reed switch to hold it open. When motor 34 rotates in response to a pulse from flow responsive device 36 to relay 38, magnet 46 rotates away from switch 40 allowing it to close and establish a holding circuit for motor 34. Magnetic assembly 42 rotates 180° until magnet 48 is positioned at the reed switch whereupon switch 40 opens and, relay switch 38a having already opened during rotation of the magnetic assembly, the motor is de-energized until a subsequent pulse is received.

The pulsed drive of motor 34 is transmitted to wheel 16 so that its position on disc 14 is indicative of the flow through flow responsive device 36. This transmission arrangement will be described with particular reference to FIG. 1, motor output shaft 44 is connected through magnetic assembly 42 to shaft 50. Shaft 50 is journaled in bearing assembly 52 and carries miter gear 54. Miter gear 54 engages a second miter gear 56 fixed to shaft 57 so that rotation is transmitted from shaft 50 to shaft 57 through the miter gears. Shaft 57 is supported intermediate its ends in a bearing assembly 58 connected to frame 11. Shaft 57 also carries worm gear 60 connected for rotation with shaft 57 through drive clevis 62. The drive clevis includes a member 64 fixed to shaft 57 for rotation therewith and a second member 66 connected to and movable with worm gear 60. The drive connection between shaft 57 and worm gear 60 is established by a tongue 65 on drive clevis member 64 and a groove 70 in drive clevis member 66. With this arrangement worm 60, with member 66 attached thereto, can move axially on shaft 57 between a C-ring 72 at one end of the shaft and member 64. The C-ring and member 64 are arranged so that the tongue is always engaged in groove 70 and a driving connection is maintained at all times between members 64 and 66.

Worm gear 60 meshes with worm gear 74 which is connected to wheel 16 for joint rotation and axial movement with wheel 16 on shaft 18. Worm gears 60 and 74 are oppositely turned, gear 74 being a right hand worm and the other a left hand worm. This completes the driving connection through which the pulsed energization of motor 34 drives wheel 16 and causes wheel 16 to assume a position on wheel 14 corresponding to and indicative of the pulsed drive of motor 34 which is in turn indicative of the flow through flow responsive device 36.

A suitable read-out device such as a slider 76 can be connected to wheel 16. As illustrated slider is connected to the end of worm gear 74 and is also supported on slider bar 78 for accuracy. A suitable pointer (not shown) can be connected to the slider and associated with suitable (not shown) indicia which, when suitably calibrated, can give a desired read-out, for example in gallons per minute. Since other read-out arrangements are possible, no specific one has been illustrated.

The pulsed input to wheel 14 would, under normal operating conditions, cause the speed of wheel 14 to fluctuate so that the wheel and the indicator would not hold a fixed position. The extreme positions of the fluctuating indicator would have to be averaged and this would only give, at best, an approximation of the true fluid flow value. This invention solves this problem through the lost motion provided in drive clevis 62 and in a manner which will now be explained in connection with the following operational description.

Assuming "wheel" 16 to be positioned at a particular point on the "disc" corresponding to a particular flow through flow measuring device 36, worms 60 and 74 will be rotating at the same speed, will act as rollers, and there will be no relative axial movement therebetween with "wheel" 16 holding its position on the "disc." Should the flow increase, this will result in an increase in the frequency of pulses to motor 34 and in increase in the driven speed of worm 60. This produces a differential in the speeds of worms 60 and 74 and initially worm 60 moves toward engagement with ring 72 which establishes a limit on axial movement of worm 60 in one axial direction. After engaging ring 72 (see FIG. 3), worm 60 acts on worm 74 driving it and "wheel" 16 radially outwardly on the "disc." As the "wheel" moves out on the "disc" its speed and that of worm 74 increase until the speed of worm 74 equals that of worm 60 whereupon worms 60 and 74 are again in balance. At this point worm 60 backs off slightly from ring 72 and is spaced from both clevis drive member 64 and ring 72 and the worm floats freely on the shaft. Relative axial movement between the worms ceases and the worms merely rotate with respect to each other with the "wheel" holding its position on the "disc." In this manner any minor variations in the driven speed of worm 60 are absorbed in axial movement of worm 74 and 60 and without producing any movement of worm 74 and the "wheel." Thus, fluctuations in the speed of motor 34 due to the pulsed output from the motor are damped out and the "wheel" and the indicator remain stationary to give an accurate, true readout. In the event of a further increase in flow rate, the position of "wheel" 16 will again be changed on the "disc" to reflect this change in flow rate at the indicator. Should the flow rate decrease, worm 60 will move to the right of the limit of the lost motion connection defined by clevis member 64 and then the differential in speed between the worms causes worm 74 to move radially inwardly on the "disc" until the speed thereof is reduced to that of worm 60 whereupon "wheel" 16 comes to rest at a circumferential line on the "disc." Again worm 60 backs off from clevis member 64 so that minor fluctuations in speed are damped out in the lost motion connection and the "wheel" and indicator remain stationary at the point indicative of the reduced flow.

The radial movement of the "wheel" on the "disc" can be limited by suitable arrangement such as limit switches 80 and 82 mounted on frame 11 and a switch actuating bracket 84 connected to and movable with slider 76. Bracket 84 is positioned between switches 80 and 82 for selective engagement therewith as the "wheel" moves inwardly and outwardly on the "disc." Both switches are operative to de-energize the device, switch 80 limiting "wheel" travel outwardly toward the periphery of the "disc" and switch 82 limiting movement of the "wheel" inwardly toward the center of the "wheel."

In a sense the lost motion connection acts as an antibacklash in that after the "wheel" has been driven to assume a new position corresponding to a changed flow it is not affected by either a temporary increase or decrease in driven speed.

With the foregoing description it will be appreciated the "hunt" limiting arrangement of this invention lends itself to use generally in any type of indicator which is intended to provide a usable read-out from a variable source. As discussed above, it can be used to provide a direct readout as to rate of fluid flow by varying the relative position between suitable output members (the "disc" and "wheel"). With modification of the read-out mechanism it could be used to chart flow, as a flow totalizer, flow indicator, etc., or generally to monitor and give a direct read-out of any variable condition which can be translated into a signal capable of energizing the drive for the "disc and wheel."

Although but one embodiment of the present invention has been illustrated and described, it will be apparent to those skilled in the art that various changes and modifications may be made therein without departing from the

I claim:

1. Apparatus of the type described comprising, in combination
   a first output member,
   a second output member engaging said first output member,
   means for driving said first output member,
   means for driving said second output member,
   means supporting said first and second output members for joint movement and for relative movement therebetween in response to and in accordance with the differential between the driven movement of said first and second output members,
   one of said drive means having a constant speed output and the other drive means having a variable speed output with the relative position between said first and second members corresponding to the speed of said other drive means,
   and means in the connection between the output member connected to said variable drive means and said variable drive means defining a lost motion connection therebetween connecting said one output member and variable drive means for relative movement between preselected limits without relative movement of said first and second output members and establishing a driving connection between said one output member and said variable drive means when said limits are reached to drive said one output member relative to the other so that fluctuations in said variable output drive means within a range corresponding to said preselected limits are accommodated in said lost motion connection without producing relative movement of said first and second output members.

2. The combination of claim 1 wherein the connection between said one output member and said variable drive means includes first and second driving members, one connected to said one output member and the other connected to said variable drive means and said lost motion connection provides for relative movement between said first and second driving members between said preselected limits and establishes, when said limits are exceeded, a driving connection between said first and second driving members to drive said one output member relative to the other.

3. The combination of claim 1 wherein one of said output members comprises a "disc" and the other a "wheel" engaging said "disc" for rotation with and radial movement with respect to said "disc."

4. In combination,
   a "disc" and "wheel" combination,
   means for driving said "disc" at a predetermined speed,
   means supporting said "wheel" in engagement with said "disc" for rotation therewith and for radial movement thereon,
   variable drive means connected to and driving said wheel,
   and motion transmitting means operatively connecting said variable drive means to said "wheel" to drive said "wheel" relative to said "disc," said motion transmitting means including means defining a lost motion connection between said "wheel" and said variable drive means and connecting said "wheel" and variable drive means for relative movement between preselected limits without movement of said "wheel" and when the limits of said lost motion connection are exceeded driving said "wheel" relative to said "disc" in accordance with said variable drive means so that fluctuations in said variable drive means within the limits of said lost motion connection are damped in said lost motion connection without movement of said "wheel" without varying the position of said wheel with respect to said "disc."

5. The combination of claim 4 wherein said motion transmitting means includes first and second members supported for rotational and axial movement,
   said first member connected to and movable with said "wheel" with said axial movement being in a radial direction with respect to said "disc,"
   said second member connected to said variable drive means and to said first member to transmit movement to said first member from said variable drive means,
   and said lost motion connection supporting said second member for axial movement relative to said first member and within said preselected limits without transmitting movement to said first member and connecting said second member to said first member at the limits of said lost motion connection to transmit movement from said variable drive means to said first member and drive said "wheel" on said "disc" in accordance with said variable drive means.

6. The combination of claim 5 wherein said first and second members comprise first and second worm means in engagement with each other,
   said first worm means connected to said "wheel" and supported for rotation and axial movement therewith,
   said second worm means connected to said variable drive means,
   means supporting said first and second worm means in engagement and for joint and relative rotational and axial movement with respect to each other,
   and said lost motion connecting means in the connection of said second worm means to said variable drive means and supporting said second worm means for axial movement relative to said first worm means within said preselected limits and providing a rotatable driving connection between said second worm means and variable drive means throughout said axial movement within said limits.

7. The combination of claim 4 wherein said motion transmitting means includes first worm means connected to and movable with said "wheel" both rotatably and radially with respect to said "disc," second worm means engaging said first worm means, and lost motion connection means between said second worm means and said variable drive means,
   means supporting said "wheel" and first worm means for rotation and radial movement with respect to said "disc," said radial movement of said first worm means being parallel to the worm axis thereof,
   and said lost motion connection means supporting said second worm means for rotation and for limited axial movement parallel to the axis of said first worm means and between axially spaced limits which limits provided said lost motion connection limits and including means providing a rotatable driving connection between said variable drive means and said second worm means throughout said limited axial movement.

8. The combination of claim 7 wherein said lost motion connection means includes a first member including means defining an axially extending groove and a second member including means defining an axially extending surface engaged in said groove,
   one of said first and second members being connected to and movable with said second worm means and the other being fixed axially relative to said second worm means with said groove and axially extending surfaces being arranged and having a length sufficient to maintain a rotatable drive connection between said first and second members throughout the limits of relative axial movement therebetween.

9. The combination of claim 8 including means for pulsing said variable drive means to drive said "wheel."

10. The combination of claim 9 including indicating means connected to and movable with said "wheel."

11. In combination,
    a disc, means for rotating said disc at a predetermined speed,
a wheel engaging the surface of said disc,
means supporting said wheel for movement on the surface of said disc toward and away from the disc periphery,
first worm gear means connected to said wheel and movable with said wheel relative to said disc both rotatably and with respect to said disc periphery,
second worm gear means,
and connection means for transmitting driven movement other than said disc movement to said wheel and supporting said second worm gear means for limited axial movement relative to said first worm gear means between axially spaced limits, said connecting means also operative to transmit rotary motion to said second gear means throughout the extent of said limited axial movement so that between said limits said second worm gear means moves relative to said first worm gear and at said limits said second worm gear means transmits driving motion to said first worm gear means to vary the position of said wheel on said disc in accordance with the input to said second worm gear means through said connecting means with the lost motion provided in said connecting means by said limited axial movement accommodating fluctuations in the input through said connecting means between preselected limits without varying the position of said wheel on said disc.

References Cited

UNITED STATES PATENTS

| | | | |
|---|---|---|---|
| 1,625,511 | 4/1927 | Ungerer | 64—6 |
| 1,669,931 | 5/1928 | Dowrie | 64—6 X |
| 1,835,240 | 12/1931 | Rollings | 74—194 X |
| 2,571,599 | 10/1951 | Milne | 74—194 X |
| 3,135,125 | 6/1964 | Erickson | 74—194 |
| 3,183,790 | 5/1965 | Raymond | 74—194 X |
| 3,276,240 | 10/1966 | Thies | 74—194 X |

FRED C. MATTERN, JR., *Primary Examiner.*

CORNELIUS J. HUSAR, *Examiner.*